W. A. RICH, Jr.
SEALING WAX WAFER.
APPLICATION FILED MAR. 13, 1915.

1,185,541.                                              Patented May 30, 1916.

Witnesses:
Josephine H. Ryan
Richard W. Hall

Inventor:
Waldo A. Rich Jr.,
by Roberts, Roberts & Cushman.
Attys.

THE COLUMBIA PLANOGRAPH CO., WASHINGTON, D. C.

UNITED STATES PATENT OFFICE.

WALDO A. RICH, JR., OF FRAMINGHAM, MASSACHUSETTS, ASSIGNOR TO DENNISON MANUFACTURING COMPANY, OF BOSTON, MASSACHUSETTS, A CORPORATION OF MASSACHUSETTS.

SEALING-WAX WAFER.

1,185,541. Specification of Letters Patent. Patented May 30, 1916.

Continuation in part of application Serial No. 10,269, filed February 24, 1915. This application filed March 13, 1915. Serial No. 14,271.

*To all whom it may concern:*

Be it known that I, WALDO A. RICH, Jr., a citizen of the United States, and resident of Framingham, in the county of Middlesex and State of Massachusetts, have invented new and useful Improvements in Sealing-Wax Wafers, of which the following is a specification.

My invention consists in an improved sealing wafer of fusible wax, and is adapted to be fused and attached to paper or other objects by the use of heat radiated, for example, from a lamp or an electrically heated tool. The old method of using stick sealing wax has its well known disadvantages, and it has heretofore been proposed to employ preformed disk-shaped wafers of sealing wax, of substantially uniform thickness throughout, to be laid on the spot where the sealing is to take place and then subjected to heat radiated from some hot object held near the wafer. Electrically heated tools are well adapted to this work. Sealing wax is, however, a rather poor conductor of heat and the preformed wafers of sealing wax heretofore provided have not proved satisfactory. The exposed parts melt before the protected parts have received enough heat to become sufficiently soft properly to adhere to the paper or other article being sealed. If the heat is applied long enough thoroughly to heat the inner and protected parts of the wafer, the parts first melted are liable to become too fluid and spread. There is danger, also, of charring the paper or igniting the wax if the heat be prolonged to the point of that thorough fusion of the wax essential to insure the affixation of the wafer. To obviate these defects I have contrived a sealing wafer of fusible sealing wax which, instead of being disk-shaped and of substantially uniform thickness throughout, is so shaped or formed that the wax which is first melted can immediately flow upon the paper or other article being sealed.

Figure 1:
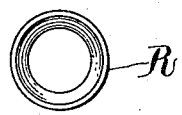
Figure 2:
Figure 3:
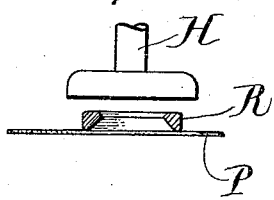
Figure 4:
Figure 5:
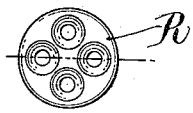
Figure 6:
Figure 7:
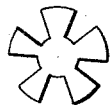
Figure 8:
Figure 9:
Figure 10:
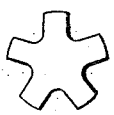

In the drawings hereto annexed which illustrate certain embodiments of my invention, Figure 1 is a plan view of the improved sealing wafer in its preferred form; Fig. 2 is a vertical median section thereof; Fig. 3 shows the mode of fusing the wafer; Fig. 4 shows a modified form; Fig. 5 shows another modification in plan; Fig. 6 shows a section of Fig. 5; Figs. 7, 8, 9 and 10 show other modifications in plan.

The preferred form of sealing wafer is shown in Figs. 1, 2 and 3. In said figures R is a ring of sealing wax preferably beveled on its inner face, as shown, and adapted to be laid on the paper P (Fig. 3) at the point to be sealed. The heating tool H is then brought close to the annular wafer R. Heat radiating from said tool at once softens and fuses the exposed top of the wafer and the melted wax immediately begins to flow downward through the central opening or pocket onto the paper or other article being sealed. The outer lower portions of the ring receive the heat and fuse last of all, thus holding the internal fused wax so that it spreads inwardly toward the center being thoroughly fused and making close contact with the paper. When the ring has been thus transformed into a disk of fused wax the heating tool may be removed and the impressing tool applied. The instant that the wax has filled the inner space originally inclosed by the ring is a favorable time to remove the heat and make the impression.

In Fig. 4 a modification is shown in which the relatively thin web of wax R' closes the ring R at the top. In this form of the invention the heat radiating from the tool first softens and fuses the web R' so that the wax first fused flows through the pocket and comes at once into contact with the paper.

In the modification shown in Figs. 5 and 6, the wafer has a plurality of apertures or pockets. These, like the single pocket of Figs. 1, 2 and 4, afford means by which the wax at the top of the wafer which is first melted finds its way at once to the paper or other article being sealed.

In each of the modified forms shown in Figs. 7 to 10 inclusive, marginal recesses or pockets are provided within the periphery of the wafer as in the forms already described, which afford provision for the ready passage of the wax at the top which is first heated and fused to flow upon the paper or other article on which the seal is laid, and make close contact therewith.

The present application is a continuation of my application Serial No. 10,269, filed February 24, 1915.

I claim:

1. A wafer of sealing wax comprising a substantially flat body having a pocket within which the wax first fused may flow onto the object to be sealed.

2. A perforate wafer of sealing wax.

3. An annular wafer of sealing wax.

4. An annular wafer of sealing wax having an inner beveled face.

5. A wafer of sealing wax having a pocket within its periphery, open top and bottom, whereby the wax which is first fused may flow within said pocket upon the object being sealed.

Signed by me at Boston, Massachusetts, this 10th day of March, 1915.

WALDO A. RICH, Jr.

Witnesses:
CHARLES D. WOODBERRY,
JOSEPHINE H. RYAN.

Copies of this patent may be obtained for five cents each, by addressing the "Commissioner of Patents, Washington, D. C."